United States Patent
Steffen et al.

(10) Patent No.: US 7,461,937 B2
(45) Date of Patent: Dec. 9, 2008

(54) SOFT CONTACT LENSES DISPLAYING SUPERIOR ON-EYE COMFORT

(75) Inventors: Robert Steffen, Webster, NY (US); Kevin McCabe, St. Augustine Beach, FL (US); David Turner, Jacksonville, FL (US); Azaam Alli, Jacksonville, FL (US); Kent Young, Jacksonville, FL (US); Cristina Schnider, Jacksonville, FL (US); Gregory A. Hill, Atlantic Beach, FL (US)

(73) Assignee: Johnson & Johnson Vision Care, Inc., Jacksonville, FL (US)

( * ) Notice: Subject to any disclaimer, the term of this patent is extended or adjusted under 35 U.S.C. 154(b) by 0 days.

(21) Appl. No.: 11/036,669

(22) Filed: Jan. 14, 2005

(65) Prior Publication Data
US 2005/0179862 A1    Aug. 18, 2005

Related U.S. Application Data

(63) Continuation-in-part of application No. 10/236,762, filed on Sep. 6, 2002, now Pat. No. 7,052,131.

(60) Provisional application No. 60/537,369, filed on Jan. 17, 2004, provisional application No. 60/318,536, filed on Sep. 10, 2001.

(51) Int. Cl.
G02C 7/04    (2006.01)

(52) U.S. Cl. .............................. 351/160 H; 351/160 R; 351/177

(58) Field of Classification Search .............. 351/160 H
See application file for complete search history.

(56) References Cited

U.S. PATENT DOCUMENTS

| 3,408,429 A | 10/1968 | Wichterle |
|---|---|---|
| 3,660,545 A | 5/1972 | Wichterle |
| 3,808,178 A | 4/1974 | Gaylord |
| 3,854,982 A | 12/1974 | Aelion et al. |
| 3,916,033 A | 10/1975 | Merrill |

(Continued)

FOREIGN PATENT DOCUMENTS

EP    0 094 153 A    11/1983

(Continued)

OTHER PUBLICATIONS

U.S. Appl. No. 10/954,560, filed Jun. 6, 2006, Laredo et al.

(Continued)

*Primary Examiner*—Jessica T Stultz
(74) *Attorney, Agent, or Firm*—Karen A. Harding

(57) ABSTRACT

The present invention relates to soft contact lenses having an overall comfort preference of at least about 2 to 1 as compared to an Acuvue® contact lens and measured after one week of daily wear. The present invention further relates to a soft contact lens comprising an oxygen transmissibility greater than about 70 barrers/mm and physical properties suitable to provide wearer comfort over at least about 9 hours in at least about 80% of wearers, as measured in a randomized, double masked clinical study.

25 Claims, 7 Drawing Sheets

U.S. PATENT DOCUMENTS

| | | | |
|---|---|---|---|
| 3,929,741 A | 12/1975 | Laskey | |
| 3,966,847 A | 6/1976 | Seideman | |
| 4,113,224 A | 9/1978 | Clark et al. | |
| 4,120,570 A | 10/1978 | Gaylord | |
| 4,123,407 A | 10/1978 | Gordon | |
| 4,123,408 A | 10/1978 | Gordon | |
| 4,136,250 A | 1/1979 | Mueller et al. | |
| 4,139,513 A | 2/1979 | Tanaka et al. | |
| 4,139,548 A | 2/1979 | Tanaka et al. | |
| 4,139,692 A | 2/1979 | Tanaka et al. | |
| 4,153,641 A | 5/1979 | Deichert et al. | |
| 4,197,266 A | 4/1980 | Clark et al. | |
| 4,235,985 A | 11/1980 | Tanaka et al. | |
| 4,259,467 A | 3/1981 | Keogh et al. | |
| 4,260,725 A | 4/1981 | Keogh et al. | |
| 4,261,875 A | 4/1981 | LeBoeuf | |
| 4,277,595 A | 7/1981 | Deichert et al. | |
| 4,294,974 A | 10/1981 | LeBoeuf | |
| 4,487,905 A | 12/1984 | Mitchell | |
| 4,495,313 A | 1/1985 | Larsen | |
| 4,649,184 A | 3/1987 | Yoshikawa et al. | |
| 4,659,777 A | 4/1987 | Riffle et al. | |
| 4,680,336 A | 7/1987 | Larsen et al. | |
| 4,703,097 A | 10/1987 | Wingler et al. | |
| 4,711,943 A | 12/1987 | Harvey | |
| 4,740,533 A | 4/1988 | Su et al. | |
| 4,771,089 A | 9/1988 | Ofstead | |
| 4,786,657 A | 11/1988 | Hammar et al. | |
| 4,810,764 A | 3/1989 | Friends et al. | |
| 4,889,664 A | 12/1989 | Kindt-Larsen et al. | |
| 4,890,911 A * | 1/1990 | Sulc et al. | 351/160 H |
| 4,910,277 A | 3/1990 | Bambury et al. | |
| 4,920,184 A | 4/1990 | Schafer et al. | |
| 4,954,586 A | 9/1990 | Toyoshima et al. | |
| 4,954,587 A | 9/1990 | Mueller | |
| 5,002,794 A | 3/1991 | Ratner et al. | |
| 5,010,141 A | 4/1991 | Mueller | |
| 5,034,461 A | 7/1991 | Lai et al. | |
| 5,039,459 A | 8/1991 | Kindt-Larsen et al. | |
| 5,044,742 A * | 9/1991 | Cohen | 351/161 |
| 5,070,215 A | 12/1991 | Bambury et al. | |
| 5,079,319 A | 1/1992 | Mueller | |
| 5,115,056 A | 5/1992 | Mueller et al. | |
| 5,219,965 A | 6/1993 | Valint, Jr. et al. | |
| 5,244,981 A | 9/1993 | Seidner et al. | |
| 5,258,490 A | 11/1993 | Chang | |
| 5,260,000 A | 11/1993 | Nandu et al. | |
| 5,304,584 A | 4/1994 | Nunez et al. | |
| 5,314,960 A | 5/1994 | Spinelli et al. | |
| 5,314,961 A | 5/1994 | Anton et al. | |
| 5,321,108 A | 6/1994 | Kunzler et al. | |
| 5,331,067 A | 7/1994 | Seidner et al. | |
| 5,334,681 A | 8/1994 | Mueller et al. | |
| 5,336,797 A | 8/1994 | McGee et al. | |
| 5,352,714 A | 10/1994 | Lai et al. | |
| 5,357,013 A | 10/1994 | Bambury et al. | |
| 5,358,995 A | 10/1994 | Lai et al. | |
| 5,364,918 A | 11/1994 | Valint, Jr. et al. | |
| 5,371,147 A | 12/1994 | Spinelli et al. | |
| 5,387,632 A | 2/1995 | Lai et al. | |
| 5,387,662 A | 2/1995 | Kunzler et al. | |
| 5,401,508 A | 3/1995 | Manesis | |
| 5,451,617 A | 9/1995 | Lai et al. | |
| 5,484,863 A | 1/1996 | Molock et al. | |
| 5,486,579 A | 1/1996 | Lai et al. | |
| 5,525,691 A | 6/1996 | Valint et al. | |
| 5,534,605 A | 7/1996 | Bambury et al. | |
| 5,539,016 A | 7/1996 | Kunzler et al. | |
| 5,541,617 A | 7/1996 | Connolly et al. | |
| 5,565,539 A | 10/1996 | Nunez et al. | |
| 5,589,563 A | 12/1996 | Ward et al. | |
| 5,690,953 A | 11/1997 | Molock et al. | |
| 5,710,302 A | 1/1998 | Kunzler et al. | |
| 5,714,557 A | 2/1998 | Kunzler et al. | |
| 5,760,100 A | 6/1998 | Nicolson et al. | |
| 5,776,611 A | 7/1998 | Elton et al. | |
| 5,776,999 A | 7/1998 | Nicolson et al. | |
| 5,779,943 A | 7/1998 | Enns et al. | |
| 5,789,461 A | 8/1998 | Nicolson et al. | |
| 5,849,811 A | 12/1998 | Nicolson et al. | |
| 5,908,906 A | 6/1999 | Kunzler et al. | |
| 5,944,853 A | 8/1999 | Molock et al. | |
| 5,959,117 A | 9/1999 | Ozark et al. | |
| 5,962,548 A | 10/1999 | Vanderlaan et al. | |
| 5,965,631 A | 10/1999 | Nicolson et al. | |
| 5,994,488 A | 11/1999 | Yokota et al. | |
| 5,998,498 A | 12/1999 | Vanderlaan et al. | |
| 6,020,445 A | 2/2000 | Vanderlaan et al. | |
| 6,087,415 A | 7/2000 | Vanderlaan et al. | |
| 6,218,503 B1 | 4/2001 | Lai et al. | |
| 6,242,041 B1 | 6/2001 | Katoot et al. | |
| 6,367,929 B1 | 4/2002 | Maiden et al. | |
| 6,478,423 B1 | 11/2002 | Turner et al. | |
| 6,638,991 B2 * | 10/2003 | Baba et al. | 522/99 |
| 6,940,580 B2 * | 9/2005 | Winterton et al. | 351/160 H |
| 7,084,188 B2 * | 8/2006 | Lai et al. | 523/107 |
| 2002/0006521 A1 | 1/2002 | Shimoyama et al. | |
| 2002/0016383 A1 | 2/2002 | Iwata et al. | |
| 2002/0107337 A1 | 8/2002 | Rosenzweig et al. | |
| 2003/0052424 A1 | 3/2003 | Turner et al. | |
| 2003/0125498 A1 | 7/2003 | McCabe et al. | |
| 2003/0162882 A1 | 8/2003 | McCabe et al. | |
| 2005/0237480 A1 * | 10/2005 | Allbritton et al. | 351/160 R |

FOREIGN PATENT DOCUMENTS

| | | |
|---|---|---|
| EP | 0 131 468 B1 | 1/1985 |
| EP | 0080539 B1 | 5/1986 |
| EP | 0 124 017 B1 | 7/1989 |
| EP | 0 396 364 A | 11/1990 |
| EP | 0420403 B1 | 10/1993 |
| EP | 0 643 083 A | 3/1995 |
| EP | 0735092 A2 | 10/1996 |
| EP | 0 908 744 A1 | 4/1999 |
| EP | 0940693 A2 | 9/1999 |
| EP | 0 985 520 A2 | 3/2000 |
| EP | 0 989 418 A | 3/2000 |
| WO | WO 91/04283 A1 | 4/1991 |
| WO | WO 91/04288 A1 | 4/1991 |
| WO | WO 91/10155 | 7/1991 |
| WO | WO 92/07013 A1 | 4/1992 |
| WO | WO 92 18548 A1 | 10/1992 |
| WO | WO 95/20476 A1 | 8/1995 |
| WO | WO 96/31792 A1 | 10/1996 |
| WO | WO 97/20851 A1 | 6/1997 |
| WO | WO 97/20852 A1 | 6/1997 |
| WO | WO 00/02937 A1 | 1/2000 |
| WO | WO 00/35365 A | 6/2000 |
| WO | WO 01 27174 A1 | 4/2001 |
| WO | WO 01/30558 A1 | 5/2001 |
| WO | WO 01/70824 A | 9/2001 |
| WO | WO 01/70837 A1 | 9/2001 |
| WO | WO 02/16974 A2 | 2/2002 |
| WO | WO 02/20631 A1 | 3/2002 |
| WO | WO 02/31007 A1 | 4/2002 |
| WO | WO 02/081485 A1 | 10/2002 |
| WO | WO 02/081532 A1 | 10/2002 |
| WO | WO 03/021336 A1 | 3/2003 |
| WO | WO 03/021337 A1 | 3/2003 |
| WO | WO 03/027123 A1 | 4/2003 |

WO WO 03/042222 A1 5/2003

OTHER PUBLICATIONS

U.S. Appl. No. 10/954,559, filed Apr. 6, 2006, Laredo et al.

U.S. Appl. No. 60/452,898, filed Mar. 7, 2003, Vander laan et al.

Baron, R. et.al., The Role of Bulky Polysiloxanyanyalkyl Methacrylates in Polyurethane-Polysiloxane Hydrogels, J. of Applied Polymer Science, May 23, 1996, pp. 1193-1189, vol. 60, No. 8, John Wiley & Sons, New York, USA.

Contact-Lens Related Case Studies-Superior Epithelial Arcuate Lesions (SEAL) 'Epithelial Splitting,' Contact Lens Monthly, Optician, Nov. 6, 1998, p. 30, vol. 216, No. 5676.

Conway, H.D. et.al., The Effects of Contact Lens Deformation on Tear Film Pressure and Thickness During Motion of the Lens Towards the Eye, J. of Biochemical Engineering, Feb. 1983, pp. 47-50, vol. 105.

Crivello J.V. & Dietliker K.; XI Commercial Sources Of Free Radical Photoinitiators, Vol. III, Photoinitiators for Free Radical Cationic & Anionic Photopolymerisation, 1998, 275-298, 2nd Edition by edited by G. Bradley; John Wiley and Sons; New York.

Domschke A., Lohmann D., Morphology Requirement for On-Eye Mobility of Soft Oxygen Permeable Contact Lenses, Polymeric Materials Science & Engineering, Spring Meeting Apr. 13-17, 1997, pp. 42-43, vol. 76.

Gerry, P., Bilateral Superior Epithelial Arcuate Lesions: A Case Report, Clinical & Experimental Optometry, Sep.-Oct. 1995, pp. 194-195.

ISO 9913-1: 1996(E), Optics and Optical Instruments—Contact Lenses—Part 1: Determination of Oxygen Permeability and Transmissibility by the FATT Method, Nov. 1, 1996, 1st Edition, International Organization for Standardization, Geneve, Switzerland.

Kunzler, Jay F., Silicone Hydrogels for Contact Lens Applications, Trends in Polymer Science (TRIP), Feb. 1996, pp. 52-59, vol. 4, No. 2, Peter Desmond, Elsevier Science LTD.

Lai, Y-C., Role of Bulky Polysiloxanylalkyl Methacrylates in Oxygen-Permeable Hydrogel Materials, J. of Applied Polymer Science, Apr. 18, 1995, pp. 317-324, vol. 56, No. 3, John Wiley & Sons, Inc., New York, USA.

Martin, D.K., & Holden B.A., Forces Developed Beneath Hydrogel Contact Lenses Due to Squeeze Pressure, Physics in Medicine & Biology, 1986, pp. 635-649, vol. 30, No. 6.

PCT International Search Report, dated Apr. 8, 2003, for PCT/ Int'l. Appln. No. PCT/US02/28613.

PCT International Search Report, dated Apr. 17, 2003, for PCT/ Int'l. Appln. No. PCT/US02/28614.

Photofile—Part Three Superior Epithelial Arcuate Lesions, Contact Lens Monthly, Optician, May 5, 1995, pp. 32-33, vol. 209, No. 5500.

Tanabe, Yukio, Abstract of DialogMed Document, File No. 5, Accession No. 11517476, A Case of Dry Eye with Bilateral Superior Epithelial Arcuate Lesion, Rinsho Ganka, Mar. 1998, pp. 350-352, 52(3).

Encyclopedia of Polymer Science and Engineering, N-Vinyl Amide Polymers, Second edition, vol. 17, pp. 198-257, John Wiley & Sons Inc. and reported in K-values.

Bennett, E.S., "How Important Are Lens Oxygen Ratings?", Cornea 9(Suppl. 1):S4-7, 1990.

\* cited by examiner

SOFT CONTACT LENSES DISPLAYING SUPERIOR ON-EYE COMFORT

RELATED U.S. APPLICATIONS

This application claims priority from provisional application U.S. Ser. No. 60/537,369, filed on Jan. 17, 2004. This application is also a continuation-in-part of U.S. Ser. No. 10/236,762. U.S. Ser. No. 10/236,762, now U.S. Pat. No. 7,052,131, was filed on Sep. 6, 2002, and claims the priority of provisional application Ser. No. 60/318,536, filed on Sep. 10, 2001.

FIELD OF THE INVENTION

This invention relates to soft contact lenses displaying superior comfort when worn on eye. In particular, the invention relates to soft contact lenses displaying a unique combination of properties which provide superior on eye comfort.

BACKGROUND OF THE INVENTION

Soft contact lenses have been available since the 1980s. Currently there are two types of soft contact lenses. "Conventional" lenses are made from hydrophilic polymers such as poly(2-hydroxyethyl methacrylate) (PHEMA) and copolymers of N-vinyl pyrrolidone and methyl methacrylate. These contact lenses have relatively low permeability to oxygen (typically below 8-30 barrers), but high water content (typically in excess of 35%). Examples of a conventional soft contact lens include Acuvue® and Acuvue2® brand contact lenses, both of which are considered as among the most comfortable soft contact lenses commercially available. However, many lens wearers cannot comfortably wear conventional lenses for a full day (up to nine hours or more).

Contact lens wearers commonly report symptoms of dryness and discomfort while wearing contact lenses. These symptoms can be exacerbated in environments prone to low relative humidity, such as pressurized airline cabins, home or office environments that use forced-air heating or air-conditioning systems, as well as locales and environments subject to low ambient humidity. The relative humidity in commercial airlines commonly ranges from as low as 5% to under 40%, with mean values averaging between 14-19%.

Silicone hydrogel contact lenses contain silicone in the lens polymer. Silicone increases the lens's oxygen permeability, which contributes to the lenses ability to be worn for longer periods of continuous wear. However, commercially available silicone hydrogel contact lenses are perceived by many lens wearers to be less comfortable than conventional contact lenses. Accordingly, there remains a need in the industry for a contact lens which can be worn comfortably for a full day of wear, even in low humidity environments.

SUMMARY OF THE INVENTION

The present invention relates to soft contact lenses having an overall comfort preference of at least about 2 to 1 as compared to an Acuvue® contact lens and measured after one week of daily wear.

The invention also relates to soft contact lenses having an overall comfort preference of at least about 2 to 1 as compared to an Acuvue2® contact lens and measured after one week of daily wear.

The invention further relates to soft contact lenses having a modulus of less than about 100 psi, oxygen transmissibility of at least about 80 barrers/mm and a dynamic coefficient of friction of less than about 0.01 when measured at a sliding speed of 10 cm/second, provided however, said contact lens is not coated with polyacrylic acid or poly(N,N-dimethylacrylamide).

DETAILED DESCRIPTION OF THE INVENTION

Figure 1:
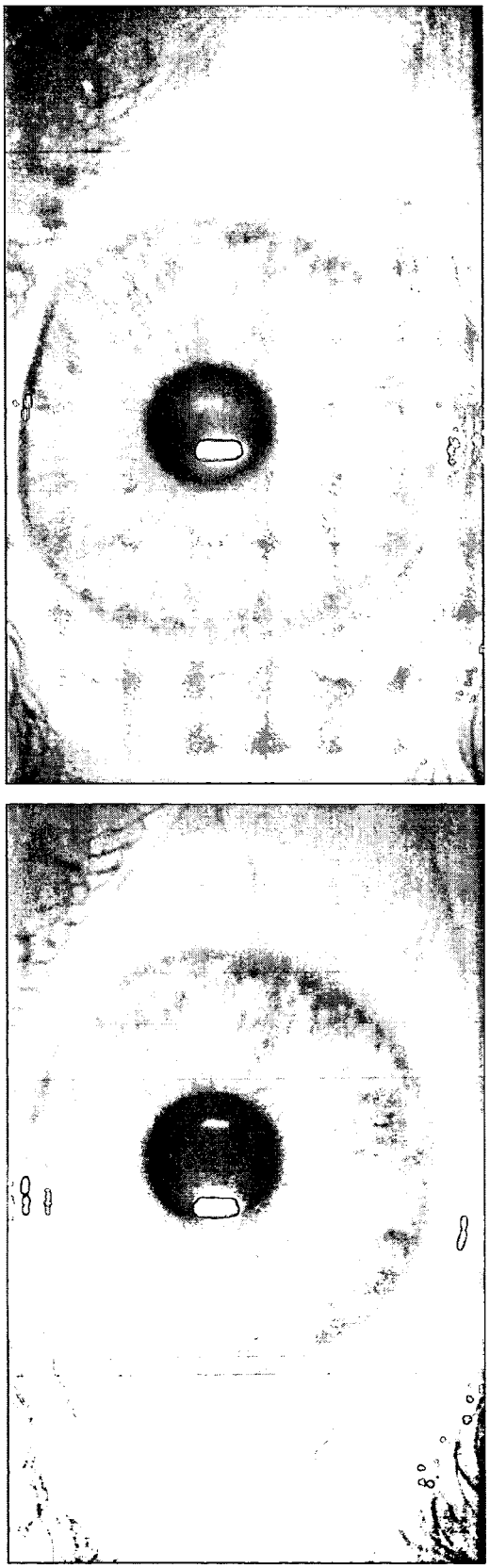
FIG. 1 contains two photographs of the right eye of a clinical trial patient wearing spectacle lenses for one month.

It has been surprisingly found that contact lenses having a unique balance of properties display superior comfort compared to presently available soft contact lenses. The contact lenses of the present invention display superior overall comfort throughout wear, and at the end of the day. The lenses of the present invention were found, in clinical trials to be significantly more comfortable than Acuvue® or Acuvue®2 brand contact lenses, both of which are recognized in the industry as lenses which are among the most comfortable commercially available lenses. By significant, we mean a preference rating of at least 2 to 1 in a double masked, clinical trial with at least about 20 patients completing the trial and wearing lenses for at least 8 hours per day for at least one week. End of day comfort data was collected at least 8 hours after lens insertion. The questionnaires allowed participants the following choices: preferred the test lens, preferred the control lens, preferred both lenses or preferred neither lens. Ratings were generated using all responses indicating a preference between the lenses. Acuvue2® and Acuvue® brand contact lenses are soft hydrogel contact lenses made from etafilcon A and commercially available from Johnson & Johnson Vision Care, Inc.

Lenses of the present invention were also found to provide improved comfort in low humidity environments, generally under 40% relative humidity, such as airline cabins, heated and air conditioned buildings and the like.

It has been surprisingly found that lenses that have a modulus of less than about 140 psi, an oxygen transmissibility, Dk/t, of at least about 70 barrers/mm and a dynamic coefficient of friction ("COF") of less than about 0.01, display superior comfort. Low modulus provides a soft and flexible lens. High oxygen transmissibility provides sufficient levels of oxygen to the cornea to prevent redness and promote corneal health, and a low dynamic COF provides the lens with a lubricious, silky feel.

Preferably the Dk/t is at least about 80 barrers/mm, in some embodiments at least about 90, and for contact lenses which are intended to be worn continuously for two weeks or more, preferably at least about 100 barrers/mm. In some embodiments, Dk/t of at least about 140 barrer/mm may be desirable.

Preferably the modulus is less than about 120 psi, more preferably less than about 100 psi, and in some embodiments between about 40 and 100 psi.

Additionally contact lenses of the present invention may have water contents of at least about 30%, and preferably between about. 30 and about 50%. The contact lenses of the present invention may also display advancing contact angles of less than about 80° and preferably less than about 70° as measured using a Wilhelmy dynamic contact angle balance.

Suitable components for producing soft contact lenses having a variety of properties are known in the art. The combination of components to provide the novel combination of properties disclosed in the present invention will now be described.

The oxygen transmissibility may be imparted to the lens formulation by including at least one silicone containing component in the lens formulation. Suitable silicone containing components include silicone containing monomers, prepolymer and/or macromers.

The term "monomer" used herein refers to lower molecular weight compounds that can be polymerized to higher molecular weight compounds, polymers, macromers, or prepolymers. The term "macromer" as used herein refers to a high molecular weight polymerizable compound. Prepolymers are partially polymerized monomers or monomers which are capable of further polymerization.

A "silicone-containing monomer" is one that contains at least two [—Si—O—] repeating units in a monomer, macromer or prepolymer. Preferably, the total Si and attached O are present in the silicone-containing monomer in an amount greater than 20 weight percent, and more preferably greater than 30 weight percent of the total molecular weight of the silicone-containing monomer. Useful silicone-containing components preferably comprise polymerizable functional groups such as acrylate, methacrylate, acrylamide, methacrylamide, N-vinyl lactam, N-vinylamide, and styryl functional groups. Examples of silicone-containing components which are useful in this invention may be found in U.S. Pat. Nos. 3,808,178; 4,120,570; 4,136,250; 4,153,641; 4,740,533; 5,034,461 and 5,070,215, and EP080539. All of the patents cited herein are hereby incorporated in their entireties by reference. These references disclose many examples of olefinic silicone-containing components.

While almost any silicone containing component may be included to increase the Dk of the resulting lens, in order to provide the lenses of the present invention with the desired modulus, the majority of the mass fraction of the silicone components used in the lens formulation should contain only one polymerizable functional group ("monofunctional silicone containing component"). To insure the desired balance of oxygen transmissibility and modulus it is preferred that all components having more than one polymerizable functional groups ("multifunctional components") make up no more than 10 mmol/100 g of the reactive components, and preferably no more than 7 mmol/100 g of the reactive components. Suitable monofunctional silicone containing components include polysiloxanylalkyl(meth)acrylic monomers of Formula I:

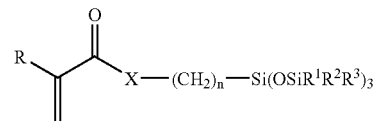

wherein: R denotes H or lower alkyl; X denotes O or $NR^4$; each $R^4$ independently denotes hydrogen or methyl,
each $R^1$-$R^3$ independently denotes a lower alkyl radical or a phenyl radical, and
n is 1 or 3 to 10.

Mono-functional polydimethylsiloxanes (mPDMS) may also be used. Suitable mPDMS compounds include Structure II:

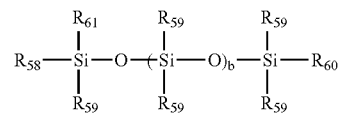

where b=0 to 100, where it is understood that b is a distribution having a mode equal to a stated value, preferably 4 to 16, more preferably 8 to 10; $R_{58}$ is a monovalent group containing at least one ethylenically unsaturated moiety, preferably a monovalent group containing a styryl, vinyl, or methacrylate moiety, more preferably a methacrylate moiety; each $R_{59}$ is independently a monovalent alkyl, or aryl group, which may be further substituted with alcohol, amine, ketone, carboxylic acid or ether groups, preferably unsubstituted monovalent alkyl or aryl groups, more preferably methyl; $R_{60}$ is a monovalent alkyl, or aryl group, which may be further substituted with alcohol, amine, ketone, carboxylic acid or ether groups, preferably unsubstituted monovalent alkyl or aryl groups, preferably a $C_{1-10}$ aliphatic or aromatic group which may include hetero atoms, more preferably $C_{3-8}$alkyl groups, most preferably butyl; and $R_{61}$ is independently alkyl or aromatic, preferably ethyl, methyl, benzyl, phenyl, or a monovalent sloganeer chain comprising from 1 to 100 repeating Si—O units. Examples of suitable mPDMS compounds include 3-methacryloxy-2-hydroxypropyloxy)propylbis(trimethylsiloxy)methylsilane, monomethacryloxypropyl terminated mono-n-butyl terminated polydimethylsiloxane., methacryloxypropylpentamethyl disiloxane, combinations thereof and the like.

Examples of polysiloxanylalkyl (meth)acrylic monomers include methacryloxypropyl tris(trimethylsiloxy) silane, pentamethyldisiloxanyl methylmethacrylate, and methyldi(trimethylsiloxy)methacryloxymethyl silane. Methacryloxypropyl tris(trimethylsiloxy)silane is the most preferred.

In some embodiments monofunctional polydimethylsiloxanes may be preferred, as they lower not only modulus, but also tan δ, while bulky silicones, such as those containing at least one branching trimethylsiloxy group will increase tan 67. Accordingly, at least about 30 and preferably at least about 60 weight % of all the silicone components should be non-bulky silicone containing compounds such as polydimethylsiloxanes.

Desirably, silicone hydrogels made according to the invention comprise at least about 20 and preferably between about 20 and 70% wt silicone containing components based on total weight of reactive monomer components from which the polymer is made.

In addition to the monofunctional silicone containing components, multifunctional silicone containing components and/or bulky silicone containing compounds may also be included in amounts which do not impart an undesirably high modulus and/or tan δ.

One class of silicone-containing components is a poly(organosiloxane) prepolymer represented by formula III:

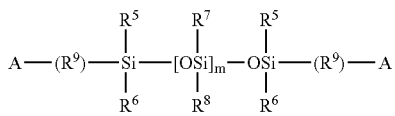

Formula III wherein each A independently denotes an activated unsaturated group, such as an ester or amide of an acrylic or a methacrylic acid or an alkyl or aryl group (providing that at least one A comprises an activated unsaturated group capable of undergoing radical polymerization); each of $R^5$, $R^6$, $R^7$ and $R^8$ are independently selected from the group consisting of a monovalent hydrocarbon radical or a halogen substituted monovalent hydrocarbon radical having 1 to 18 carbon atoms which may have ether linkages between carbon atoms;

$R^9$ denotes a divalent hydrocarbon radical having from 1 to 22 carbon atoms, and m is 0 or an integer greater than or equal to 1, and preferable 5 to 400, and more preferably 10 to 300. One specific example is α, ω-bismethacryloxypropyl polydimethylsiloxane.

Another useful class of silicone containing components includes silicone-containing vinyl carbonate or vinyl carbamate monomers of the following formula:

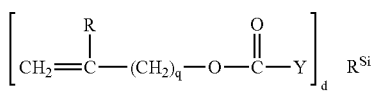

Formula III wherein: Y denotes O, S. or NH; $R^{Si}$ denotes a silicone-containing organic radical; R denotes hydrogen or methyl; d is 1, 2, 3 or 4; and q is 0 or 1. Suitable silicone-containing organic radicals $R^{Si}$ include the following:

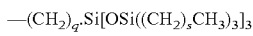

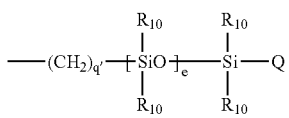

wherein:

Q denotes

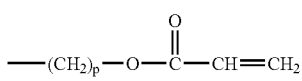

Wherein p is 1 to 6; $R^{10}$ denotes an alkyl radical or a fluoroalkyl radical having 1 to 6 carbon atoms; e is 0 to 200; q' is 1, 2, 3 or 4; and s is 0, 1, 2, 3, 4 or 5.

The silicone-containing vinyl carbonate or vinyl carbamate monomers specifically include: 1,3-bis[4-(vinyloxycarbonyloxy)but-1-yl]tetramethyl-disiloxane; 3-(vinyloxycarbonylthio) propyl-[tris (trimethylsiloxy)silane]; 3-[tris (trimethylsiloxy)silyl] propyl allyl carbamate; 3-[tris (trimethylsiloxy)silyl] propyl vinyl carbamate; trimethylsilylethyl vinyl carbonate; trimethylsilylmethyl vinyl carbonate, and

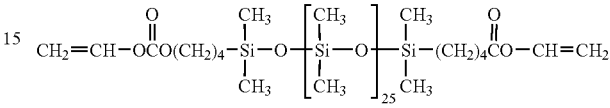

Another class of silicone-containing components includes polyurethane macromers of the following formulae:

(*D*A*D*G)$_a$*D*D*E$^1$;

E(*D*G*D*A)$_a$*D*G*D*E$^1$ or;

E(*D*A*D*G)$_a$*D*A*D*E$^1$     Formulae IV-VI wherein:

D denotes an alkyl diradical, an alkyl cycloalkyl diradical, a cycloalkyl diradical, an aryl diradical or an alkylaryl diradical having 6 to 30 carbon atoms, G denotes an alkyl diradical, a cycloalkyl diradical, an alkyl cycloalkyl diradical, an aryl diradical or an alkylaryl diradical having 1 to 40 carbon atoms and which may contain ether, thio or amine linkages in the main chain;

\* denotes a urethane or ureido linkage;

$_a$ is at least 1;

A denotes a divalent polymeric radical of formula:

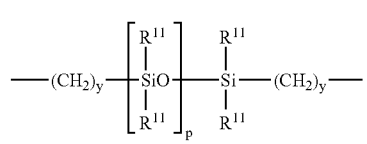

Formula VII $R^{11}$ independently denotes an alkyl or fluoro-substituted alkyl group having 1 to 0 carbon atoms which may contain ether linkages between carbon atoms; y is at least 1; and p provides a moiety weight of 400 to 10,000; each of E and E$^1$ independently denotes a polymerizable unsaturated organic radical represented by formula:

Formula VIII wherein: $R^{12}$ is hydrogen or methyl; $R^{13}$ is hydrogen, an alkyl radical having 1 to 6 carbon atoms, or a —CO—Y—$R^{15}$ radical wherein Y is —O—, Y—S— or —NH—; $R^{14}$ is a divalent radical having 1 to 12 carbon atoms; X denotes —CO— or —OCO—; Z denotes —O— or —NH—; Ar denotes an aromatic radical having 6 to 30 carbon atoms; w is 0 to 6; x is 0 or 1; y is 0 or 1; and z is 0 or 1.

A preferred silicone-containing component is a polyurethane macromer represented by the following formula:

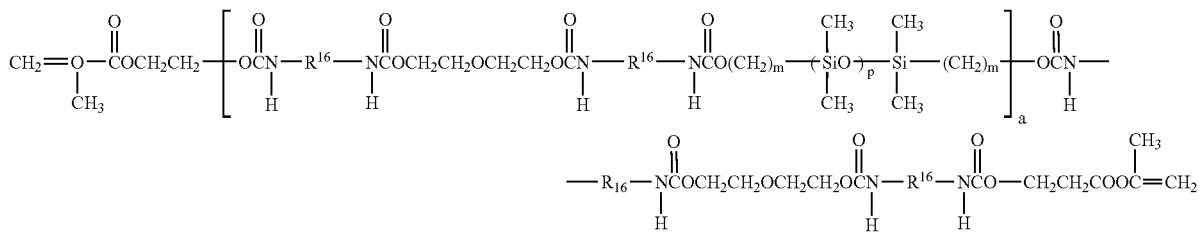

Formula IX wherein $R^{16}$ is a diradical of a disocyanate after removal of the isocyanate group, such as the diradical of isophorone diisocyanate. Another suitable silicone containing macromer is compound of formula X (in which x+y is a number in the range of 10 to 30) formed by the reaction of fluoroether, hydroxy-terminated polydimethylsiloxane, isophorone diisocyanate and isocyanatoethylmethacrylate.

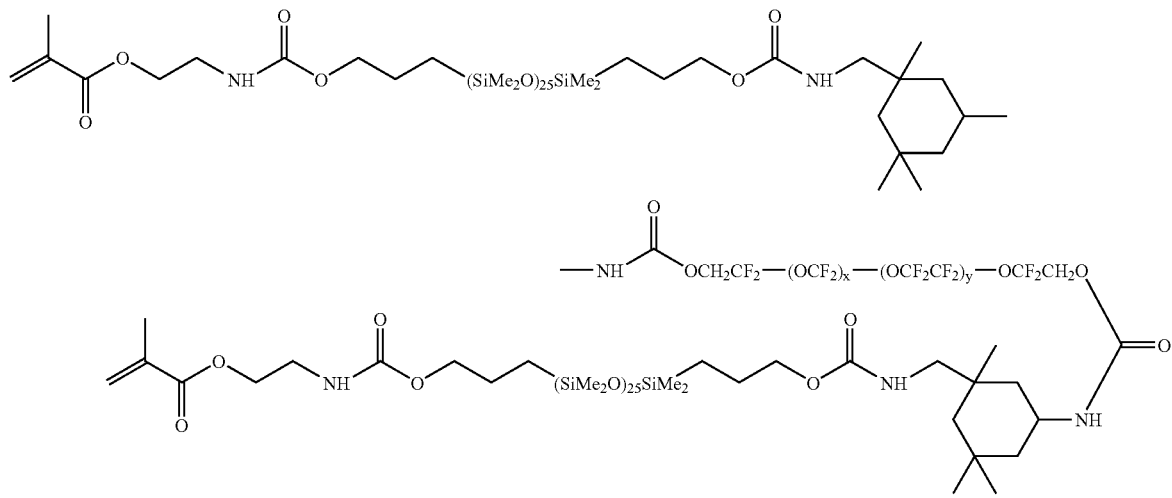

Formula X

Other silicone-containing components suitable for use in this invention include those described is WO 96/31792 such as macromers containing polysiloxane, polyalkylene ether, diisocyanate, polyfluorinated hydrocarbon, polyfluorinated ether and polysaccharide groups. U.S. Pat. Nos. 5,321,108; 5,387,662 and 5,539,016 describe polysiloxanes with a polar fluorinated graft or side group having a hydrogen atom attached to a terminal difluoro-substituted carbon atom. US 2002/0016383 describe hydrophilic siloxanyl methacrylates containing ether and siloxanyl linkanges and crosslinkable monomers containing polyether and polysiloxanyl groups. Any of the foregoing polysiloxanes can also be used as the silicone containing component in this invention.

Hydrophilic monomers are also included in the reactive components used to make the contact lenses of the present invention. The hydrophilic monomers used to make the contact lenses of this invention can be any of the known hydrophilic monomers disclosed in the prior art to make hydrogels.

The preferred hydrophilic monomers used to make the polymer of this invention may be either acrylic- or vinyl-containing. Such hydrophilic monomers may themselves be used as crosslinking agents, however, where hydrophilic monomers having more than one polymerizable functional group are used, their concentration should be limited as discussed above to provide a contact lens having the desired modulus. The term "vinyl-type" or "vinyl-containing" monomers refer to monomers containing the vinyl grouping ($-CH=CH_2$) and are generally highly reactive. Such hydrophilic vinyl-containing monomers are known to polymerize relatively easily. "Acrylic-type" or "acrylic-containing" monomers are those monomers containing the acrylic group: ($CH_2=CRCOX$) wherein R is H or $CH_3$, and X is O or N, which are also known to polymerize readily, such as N,N-dimethyl acrylamide (DMA), 2-hydroxyethyl methacrylate (HEMA), glycerol methacrylate, 2-hydroxyethyl methacrylamide, polyethyleneglycol monomethacrylate, methacrylic acid and acrylic acid.

Hydrophilic vinyl-containing monomers which may be incorporated into the silicone hydrogels of the present invention include monomers such as N-vinyl amides, N-vinyl lactams (e.g. NVP), N-vinyl-N-methyl acetamide, N-vinyl-N-ethyl acetamide, N-vinyl-N-ethyl formamide, N-vinyl formamide, with NVP being preferred.

Other hydrophilic monomers that can be employed in the invention include polyoxyethylene polyols having one or more of the terminal hydroxyl groups replaced with a functional group containing a polymerizable double bond. Examples include polyethylene glycol, ethoxylated alkyl glucoside, and ethoxylated bisphenol A reacted with one or more molar equivalents of an end-capping group such as isocyanatoethyl methacrylate ("IEM"), methacrylic anhydride, methacryloyl chloride, vinylbenzoyl chloride, or the like, to produce a polyethylene polyol having one or more terminal polymerizable olefinic groups bonded to the polyethylene polyol through linking moieties such as carbamate or ester groups.

Still further examples are the hydrophilic vinyl carbonate or vinyl carbamate monomers disclosed in U.S. Pat. No. 5,070,215, and the hydrophilic oxazolone monomers disclosed in U.S. Pat. No. 4,910,277. Other suitable hydrophilic monomers will be apparent to one skilled in the art.

More preferred hydrophilic monomers which may be incorporated into the polymer of the present invention include hydrophilic monomers such as DMA, HEMA, glycerol methacrylate, 2-hydroxyethyl methacrylamide, NVP, N-vinyl-N-methyl acrylamide, polyethyleneglycol monomethacrylate, methacrylic acid and acrylic acid with DMA being the most preferred.

The hydrophilic monomers may be present in a wide range of amounts, depending upon the specific balance of properties desired. Amounts of hydrophilic monomer up to about 50 and preferably between about 5 and about 50 weight %, based upon all components in the reactive components are acceptable. For example, in one embodiment lenses of the present invention comprise a water content of at least about 30%, and in another embodiment between about 30 and about 50%. For these embodiments, the hydrophilic monomer may be included in amounts between about 20 and about 50 weight %.

The lenses of the present invention have a dynamic COF less than 0.01. The dynamic COF may be imparted to the contact lens by incorporating a lubricious polymer into the reactive mixture from which the lens will be made, or by coating a lens with a lubricious polymer. Suitable lubricious polymers have a weight average molecular weight of at least about 50,000 Daltons, and in some embodiments greater than about 100,000 Daltons. The molecular weight may be determined via gel permeation chromatography (GPC) using a ViscoGEL GMPWXL Column with a 20/80 methanol/water ratio with a flow rate 1.0 ml/min. at 30° C.

Suitable lubricious polymers will also possess, when polymerized and crosslinked to minor amount, a water content of at least about 70%, preferably at least about 80%. For lubricious polymers which are free radical reactive, a "minor amount" of crosslinking may be effected by polymerizing the monomer(s) from which the polymer is formed with a small amount (such as about 7.5 mmol/100 gram of polymer) of crosslinker (for example, EGDMA). Methods for forming crosslinked polymers which are not free radical reactive will be apparent to those of skill in the art from the disclosure contained herein.

Alternatively, the suitability of a polymer for use as a lubricious polymer may be determined by mixing 10 wt % of the monomer from which the polymer is formed in water at room temperature. Monomers that are soluble under these conditions may be used to form lubricious polymers for use in the contact lenses of the present invention. Specific examples of lubricious polymers include high molecular weight hydrophilic polymers of polyamides, polylactones, polyimides, polylactams and functionalized polyamides, polylactones, polyimides, polylactams, such as DMA functionalized by copolymerizing DMA with a lesser molar amount of a hydroxyl-functional monomer such as HEMA, and then reacting the hydroxyl groups of the resulting copolymer with materials containing radical polymerizable groups, such as isocyanatoethylmethacrylate or methacryloyl chloride. Hydrophilic polymers or prepolymers made from DMA or n-vinyl pyrrolidone with glycidyl methacrylate may also be used. The glycidyl methacrylate ring can be opened to give a diol which may be used in conjunction with other hydrophilic prepolymers in a mixed system. Specific examples of lubricious polymers include but are not limited to poly-N-vinyl pyrrolidone, poly(N-vinyl-N-methylacetamide), poly-N-vinyl-2-piperidone, poly-N-vinyl-2-caprolactam, poly-N-vinyl-3-methyl-2-caprolactam, poly-N-vinyl-3-methyl-2-piperidone, poly-N-vinyl-4-methyl-2-piperidone, poly-N-vinyl-4-methyl-2-caprolactam, poly-N-vinyl-3-ethyl-2-pyrrolidone, and poly-N-vinyl-4,5-dimethyl-2-pyrrolidone, polyvinylimidazole, poly-N-N-dimethylacrylamide, polyvinyl alcohol, polyethylene oxide, poly 2 ethyl oxazoline, heparin polysaccharides, polysaccharides, mixtures and copolymers (including block or random, branched, multichain, comb-shaped or star shaped) thereof where poly-N-vinylpyrrolidone (PVP), poly(N-vinyl-N-methylacetamide) (PVMA) are particularly preferred. Copolymers might also be used such as graft copolymers of PVP or amphiphilic copolymers having hydrophilic and hydrophobic blocks such as those disclosed in U.S. Ser. No. 10/954,560. The lubricious polymer may be incorporated into the lens polymer without chemical bonding, such as is disclosed in US 2003/162,862 and US 2003/125,498 or may be copolymerized into the lens matrix or coated onto the contact lens, by any known method such as premold spin casting, as disclosed, for example, in US 2003/052,424, grafting, soaking the lens in a polymeric solution as disclosed in US 2002/006,521 and U.S. Pat. No. 6,478,423, and the like.

When the lubricious polymer is incorporated into the lens polymer, the lubricious polymer may also comprise polyacrylic acid. However, when the lubricious polymer is coated onto the lens, the lubricious polymer is not polyacrylic acid or poly(N,N-dimethylacrylamide).

Alternatively, the lubricious polymer may be a reactive polymer have a molecular weight as low as 2000. Suitable low molecular weight polymers are disclosed in U.S. Ser. No. 10/954559.

The lubricious polymer is incorporated into or onto the lens in amounts sufficient to provide the desired COF. When the lubricious polymer is incorporated into the lens, it may be included in the reaction mixture in amounts between about 1 to about 15 weight percent, more preferably about 3 to about 15 percent, most preferably about 5 to about 12 percent, all based upon the total of all reactive components.

When the lubricious polymer is coated onto the lens any amount which is sufficient to coat the surface of the lens and provide the desired COF may be used ("coating effective amount"). Generally, the amount of lubricious polymer used may be about 0.001 to about 100, preferably about 0.01 to about 50 and more preferably about 0.01 to about 10 weight percent of the coating solution.

Other monomers that can be present in the reaction mixture used to form the contact lenses of this invention include compatibilizing components, such as those disclosed in US 2003/162,862 and US 2003/2003/125,498, ultra-violet absorbing compounds, medicinal agents, antimicrobial compounds, copolymerizable and nonpolymerizable dyes, release agents, reactive tints, pigments, combinations thereof and the like.

A polymerization catalyst is preferably included in the reaction mixture. The polymerization initiators includes compounds such as lauryl peroxide, benzoyl peroxide, isopropyl percarbonate, azobisisobutyronitrile, and the like, that generate free radicals at moderately elevated temperatures, and photoinitiator systems such as aromatic alpha-hydroxy ketones, alkoxyoxybenzoins, acetophenones, acylphosphine oxides, bisacylphosphine oxides, and a tertiary amine plus a diketone, mixtures thereof and the like. Illustrative examples of photoinitiators are 1-hydroxycyclohexyl phenyl ketone, 2-hydroxy-2-methyl-1-phenyl-propan-1-one, bis(2,6-dimethoxybenzoyl)-2,4-4-trimethylpentyl phosphine oxide (DMBAPO), bis(2,4,6-trimethylbenzoyl)-phenyl phosphineoxide (Irgacure 819), 2,4,6-trimethylbenzyldiphenyl phosphine oxide and 2,4,6-trimethylbenzoyl diphenylphosphine oxide, benzoin methyl ester and a combination of camphorquinone and ethyl 4-(N,N-dimethylamino)benzoate. Commercially available visible light initiator systems include Irgacure 819, Irgacure 1700, Irgacure 1800, Irgacure 819, Irgacure 1850 (all from Ciba Specialty Chemicals) and Lucirin TPO initiator (available from BASF). Commercially available UV photoinitiators include Darocur 1173 and Darocur 2959 (Ciba Specialty Chemicals). These and other photoinitators which may be used are disclosed in Volume III, Photoinitiators for Free Radical Cationic & Anionic Photopolymerization, $2^{nd}$ Edition by J. V. Crivello & K. Dietliker; edited by G. Bradley; John Wiley and Sons; New York; 1998. The initiator is used in the reaction mixture in effective amounts to initiate photopolymerization of the reaction mixture, e.g., from about 0.1 to about 2 parts by weight per 100 parts of reactive monomer. Polymerization of the reaction mixture can be initiated using the appropriate choice of heat or visible or ultraviolet light or other means depending on the polymerization initiator used. Alternatively, initiation can be conducted without a photoinitiator using, for example, e-beam. However, when a photoinitiator is used, the preferred initiators are bisacylphosphine oxides, such as bis(2,4,6-trimethylbenzoyl)-phenyl phosphine oxide (Irgacure 819®) or a combination of 1-hydroxycyclohexyl phenyl ketone and bis(2,6-dimethoxybenzoyl)-2,4-4-trimethylpentyl phosphine oxide (DMBAPO), and the preferred method of polymerization initiation is visible light. The most preferred is bis(2,4,6-trimethylbenzoyl)-phenyl phosphine oxide (Irgacure 819®).

The reactive components (silicone containing component, hydrophilic monomers, lubricious polymers, and other components which are reacted to form the lens) are mixed together either with or without a diluent to form the reaction mixture. The diluent is selected to solubilize the reactive components. Suitable diluents include include those which possess both a hydrophilic and a hydrophobic nature. It has been found that the hydrophilic nature may be characterized by hydrogen donating ability, using Kamlet alpha values (also referred to as alpha values). The hydrophobic nature of the diluent may be characterized by the Hansen solubility parameter δp. Suitable diluents for the present invention are good hydrogen bond donors and polar. As used herein a "good" hydrogen bond donor, will donate hydrogen at least as readily as 3-methyl-3-pentanol. For certain diluents it is possible to measure the hydrogen bond donating ability by measuring the Kamlet alpha value (or as used herein "alpha value"). Suitable alpha values include those between about 0.05 and about 1 and preferably between about 0.1 and about 0.9.

The diluents useful in the present invention should also be relatively non-polar. The selected diluent should have a polarity sufficiently low to solubilize the non-polar components in the reactive mixture at reaction conditions. One way to characterize the polarity of the diluents of the present invention is via the Hansen solubility parameter, δp. In certain embodiments, the δp is less than about 10, and preferably less than about 6. Suitable diluents are further disclosed in U.S. Ser. No. 60/452898 and U.S. Pat. No. 6,020,445. Classes of suitable diluents include, without limitation, alcohols having 2 to 20 carbons, amides having 10 to 20 carbon atoms derived from primary amines and carboxylic acids having 8 to 20 carbon atoms. In some embodiments, primary and tertiary alcohols are preferred. Preferred classes include alcohols having 5 to 20 carbons and carboxylic acids having 10 to 20 carbon atoms.

Preferred diluents include 3,7-dimethyl-3-octanol, 1-dodecanol, 1-decanol, 1-octanol, 1-pentanol, 1-hexanol, 2-hexanol, 2-octanol, 3-methyl-3-pentanol, 2-pentanol, t-amyl alcohol, tert-butanol, 2-butanol, 1-butanol, 2-methyl-2-pentanol, 2-ethyl-1-butanol, ethanol, 3,3-dimethyl-2-butanol, 2-octyl-1-dodecanol, decanoic acid, octanoic acid, dodecanoic acid, mixtures thereof and the like.

More preferred diluents include 3,7-dimethyl-3-octanol, 1-dodecanol, 1-decanol, 1-octanol, 1-pentanol, 1-hexanol, 2-hexanol, 2-octanol, 1-dodecanol, 3-methyl-3-pentanol, 1-pentanol, 2-pentanol, t-amyl alcohol, tert-butanol, 2-butanol, 1-butanol, 2-methyl-2-pentanol, 2-ethyl-1-butanol, 3,3-dimethyl-2-butanol, 2-octyl-1-dodecanol, mixtures thereof and the like.

Various processes are known for molding the reaction mixture in the production of contact lenses, including spincasting and static casting. Spincasting methods are disclosed in U.S. Pat. Nos. 3,408,429 and 3,660,545, and static casting methods are disclosed in U.S. Pat. Nos. 4,113,224 and 4,197,266. The preferred method for producing contact lenses comprising the polymer of this invention is by the direct molding of the silicone hydrogels, which is economical, and enables precise control over the final shape of the hydrated lens. For this method, the reaction mixture is placed in a mold having the shape of the final desired silicone hydrogel, i.e. water-swollen polymer, and the reaction mixture is subjected to conditions whereby the monomers polymerize, to thereby produce a polymer in the approximate shape of the final desired product. Then, this polymer mixture is optionally treated with a solvent and then water, producing a silicone hydrogel having a final size and shape which are quite similar to the size and shape of the original molded polymer article. This method can be used to form contact lenses and is further described in U.S. Pat. Nos. 4,495,313; 4,680,336; 4,889,664; and 5,039,459, incorporated herein by reference. After producing the silicone hydrogel, the lens be may be coated with a hydrophilic coating. Some methods of adding hydrophilic coatings to a lens have been disclosed in the prior art, including U.S. Pat. Nos. 3,854,982, 3,916,033, 4,920,184, 5,002, 794, 5,779,943, 6,087,415; WO 91/04283, and EPO 93/810, 399.

The non-limiting examples below further describe this invention.

Test Methods

The dynamic contact angle or DCA, was measured at 23° C., with borate buffered saline, using a Wilhelmy balance. The wetting force between the lens surface and borate buffered saline is measured using a Wilhelmy microbalance while the sample strip cut from the center portion of the lens is being immersed into the saline at a rate of 100 microns/sec. The following equation is used $$F = 2\gamma p \cos\theta \text{ or } \theta = \cos^{-1}(F/2\gamma p)$$

where F is the wetting force, γ is the surface tension of the probe liquid, p is the perimeter of the sample at the meniscus and θ is the contact angle. Typically, two contact angles are obtained from a dynamic wetting experiment—advancing contact angle and receding contact angle. Advancing contact angle is obtained from the portion of the wetting experiment where the sample is being immersed into the probe liquid, and these are the values reported herein. At least four lenses of each composition are measured and the average is reported.

Oxygen permeability was determined by the polarographic method generally described in ISO 9913-1: 1996(E), but with the following variations. The measurement is conducted at an environment containing 2.1% oxygen. This environment is created by equipping the test chamber with nitrogen and air inputs set at the appropriate ratio, for example 1800 ml/min of nitrogen and 200 ml/min of air. The t/Dk is calculated using the adjusted $P_{O2}$. Borate buffered saline was used. The dark current was measured by using a pure humidified nitrogen environment instead of applying MMA lenses. The lenses were not blotted before measuring. Four lenses were stacked instead of using lenses of varied thickness. A curved sensor was used in place of a flat sensor. The resulting Dk value is reported in barrers (1 barrer=$10^{-10}$ ($cm^3$ of gas×$cm^2$)/($cm^3$ of polymer×sec×cm Hg). Oxygen transmissibility is oxygen permeability divided by the thickness of the lens. Lens thickness is measured using a micrometer, such as a Reider guage at the center of a hydrated lens, using a flat anvil.

The water content was measured as follows: lenses to be tested were allowed to sit in packing solution for 24 hours. Each of three test lens were removed from packing solution using a sponge tipped swab and placed on blotting wipes which have been dampened with packing solution Both sides of the lens were contacted with the wipe. Using tweezers, the test lens were placed in a weighing pan and weighed. The two more sets of samples were prepared and weighed as above. The pan was weighed three times and the average is the wet weight.

The dry weight was measured by placing the sample pans in a vacuum oven which has been preheated to 60° C. for 30 minutes. Vacuum was applied until at least 0.4 inches Hg is attained. The vacuum valve and pump were turned off and the lenses were dried for four hours. The purge valve was opened and the oven was allowed reach atmospheric pressure. The pans were removed and weighed. The water content was calculated as follows:

Wet weight=combined wet weight of pan and lenses–weight of weighing pan

Dry weight=combined dry weight of pan and lens–weight of weighing pan $$\% \text{ water content} = \frac{(\text{wet weight} - \text{dry weight})}{\text{wet weight}} \times 100$$

The average and standard deviation of the water content are calculated for the samples are reported.

Modulus was measured by using the crosshead of a constant rate of movement type tensile testing machine equipped with a load cell that is lowered to the initial gauge height. A suitable testing machine includes an Instron model 1122. A dog-bone shaped sample having a 0.522 inch length, 0.276 inch "ear" width and 0.213 inch "neck" width was loaded into the grips and elongated at a constant rate of strain of 2 in/min. until it broke. The initial gauge length of the sample (Lo) and sample length at break (Lf) were measured. Twelve specimens (either –0.05 or –1.00D) of each composition were measured and the average is reported. Tensile modulus was measured at the initial linear portion of the stress/strain curve. Percent elongation is=[(Lf–Lo)/Lo]×100.

The dynamic coefficient of friction of the contact lens was measured using a Micro-Tribometer, Model UMT-2 unit, with a pin-on-disk sample mount. The contact lens sample was removed from its packing solution and placed on the tip of the "pin" with the center of the lens on the pin tip and pressed against a highly polished stainless steel disk moving at a constant speed of either 10 or 15 cm/sec. Loads of 3, 5, 10 and 20 g were used. The duration at each load was 25 seconds and all measurements were taken at ambient temperature. The resistant frictional force was measured and was used to calculate the coefficient of friction using the following formula:

$$\mu = (F-f')/N, \text{ where}$$

μ=coefficient of friction
F=measured frictional force, f+f'
f=actual frictional force
f'=experimental artifacts due lens deformation, such as dehydration and interfacial surface tension forces, elasticity, etc.
N=normal load Seven lenses were tested for each lens type. The coefficient of friction were averaged and reported In the examples, the following abbreviations are used.

| | |
|---|---|
| SiGMA | 2-propenoic acid, 2-methyl-,2-hydroxy-3-[3-[1,3,3,3-tetramethyl-1-[(trimethylsilyl)oxy]disiloxanyl]propoxy]propyl ester |
| DAROCUR 1173 | 2-hydroxy-2-methyl-1-phenyl propane-1-one |
| DMA | N,N-dimethylacrylamide |
| HEMA | 2-hydroxyethyl methacrylate |
| mPDMS | 800-1000 MW ($M_n$) monomethacryloxypropyl terminated mono-n-butyl terminated polydimethylsiloxane |
| MAA | methacrylic acid |
| Norbloc | 2-(2'-hydroxy-5-methacrylyloxyethylphenyl)-2H-benzotriazole |
| CGI 1850 | 1:1 (wgt) blend of 1-hydroxycyclohexyl phenyl ketone and bis(2,6-dimethoxybenzoyl)-2,4-4-trimethylpentyl phosphine oxide |
| PVP | poly(N-vinyl pyrrolidone) (K value 90) |
| Blue HEMA | the reaction product of Reactive Blue 4 and HEMA, as described in Example 4 of U.S. Pat. No. 5,944,853 |
| IPA | isopropyl alcohol |
| D3O | 3,7-dimethyl-3-octanol |
| TEGDMA | tetraethyleneglycol dimethacrylate |
| TRIS | 3-methacryloxypropyltris(trimethylsiloxy)silane |
| PAA | poly(acrylic acid) |
| CGI 819 | bis(2,4,6-trimethylbenzoyl)-phenylphosphineoxide |

EXAMPLE 1

The reaction components and diluent (D3O) listed in Table 1 were mixed together until all components were dissolved. The 5 reactive components are reported as weight percent of all reactive components and the diluent is weight percent of final reaction mixture. The reaction mixture was placed into thermoplastic contact lens molds (front molds made from Zeonor®, back molds made from polypropylene) and irradiated at 60° C. with 0.5 mW/$cm^2$, followed by 1 mW/$cm^2$ then 3 mW/$cm^2$ visible light using Philips TL 20W/03T fluorescent bulbs. The molds were opened and lenses were extracted five times with IPA at ambient temperature for about 2 hours per cycle to remove residual diluent and monomers, placed into borate-buffered saline solution. The physical properties of the lenses (Dk, water content, advancing dynamic contact angle, modulus, elongation and dynamic coefficient of friction) were measured and are shown in Table 3, below.

TABLE 1

| Component | Wt % |
|---|---|
| SiGMA | 28 |
| PVP (K90) | 7 |
| DMA | 23.5 |
| MPDMS | 31 |
| HEMA | 6 |
| Norbloc | 2 |
| TEGDMA | 1.5 |
| Blue HEMA | 0.02 |
| CGI 1850 | 0.98 |
| % Diluent* | 23 |
| Diluent | D3O |

EXAMPLE 2

The lenses of Example 1 were clinically evaluated against Acuvue® brand contact lenses. The clincial evaluation, was a randomized, bilateral cross-over study with 39 patients. The lenses were worn in a daily wear mode (nightly removal) for a period of one week using ReNu MultiPlus Multi-Purpose Solution. After 30 minutes and one week of wear for each leris, the patients were asked to rate the lenses for the following: dryness, initial comfort, end of day comfort, overall preference. Each attribute is rated on a visual analog questionnaire form. The form consisted of a visual analog from 0 to 50 with verbal descriptions at specific intervals to explain the scale to the subject (50=excellent, 0=very poor). Lenses, which score above 42 on the scale, are considered good to excellent. A mean difference of five units between the lens types is considered clinically significant. Table 2 shows the preference results from the clinical study.

TABLE 2

| Attribute | Ex. 1 v. Acuvue ® contact lenses |
|---|---|
| Overall Preference | 23:6 |
| Initial Comfort | 21:3 |
| Dryness | 20:3 |
| End of Day Comfort | 18:3 |

TABLE 3

| Property | Ex 1 - | Acuvue ® contact lenses |
|---|---|---|
| Dk (barrer) | 101 | 21 |
| Center thickness (mm) | 0.078-0.0.087 | 0.011 |
| % H2O | 36-37 | 58 |
| DCA (°) | 55-57 | 82 |
| Modulus (psi) | 87 | 37 |
| Elongation (%) | 223 | 120 |
| COF (@ 10 cm/s) | 0.005 | |

EXAMPLE 3

Lenses were made from the formulation in Table 4. The preparation of the macromer used is described in US Patent application 200300052424.

Lenses were formed in using a process similar to that of Example 1, but with TOPAS® front molds and polypropylene back molds, curing under visible light at 70° C. Lenses were made as above except with the application of a polyHEMA coating to the surfaces of the molds as described in Examples 10-13 of US Patent application 200300052424.

TABLE 4

| Component | Wt % |
|---|---|
| Macromer | 18 |
| TRIS | 14 |
| PVP (K90) | 5 |
| DMA | 26 |
| MPDMS | 28 |
| HEMA | 5 |
| Norbloc | 2 |
| TEGDMA | 1 |
| Blue HEMA | 0.02 |
| CGI 1850 | 1 |
| % Diluent* | 20 |
| Diluent | D3O |

The physical properties of the lenses (Dk, water content, advancing dynamic contact angle, modulus, elongation and dynamic coefficient of friction were measured and are shown in Table 6, below.

EXAMPLE 4

The lenses of Example 3 were clinically evaluated against Acuvue® brand contact lenses. The clincial evaluation, was a randomized, bilateral cross-over study with 53 patients. The lenses were worn in a daily wear mode (nightly removal) for a period of one week using SoloCare Multi-Purpose Solution. After 30 minutes and one week of wear for each lens, the patients were asked to rate the lenses for the following: dryness, initial comfort, end of day comfort, overall preference. Each attribute is rated on a visual analog questionnaire form. The form consisted of a visual analog from 0 to 50 with verbal descriptions at specific intervals to explain the scale to the subject (50=excellent, 0=very poor). Lenses, which score above 42 on the scale, are considered good to excellent. A mean difference of five units between the lens types is considered clinically significant. Table 5 shows the preference results from the clinical study.

TABLE 5

| Attribute | Ex. 3 v. Acuvue ® contact lenses |
|---|---|
| Overall Preference | 20:10 |
| Initial Comfort | 17:10 |
| Dryness | 14:12 |
| End of Day Comfort | 16:12 |

TABLE 6

| Property | Ex 3 | Acuvue ® contact lenses |
|---|---|---|
| Dk (barrer) | 99 | 21 |
| Center Thickness (mm) | 0.064-0.072 | 0.011 |
| % H2O | 40-41 | 58 |
| DCA (°) | 83-94 | 82 |
| Modulus (psi) | 75 | 37 |
| Elongation (%) | 281 | 120 |
| COF (@ 10 cm/s) | 0.024 | |

EXAMPLE 5

Lenses were made from the formulation indicated in Table 7 in a process similar to that of Example 1.

TABLE 7

| Component | Wt % |
|---|---|
| SiGMA | 30 |
| PVP (K90) | 6 |
| DMA | 31 |
| MPDMS | 22 |
| HEMA | 8.5 |
| Norbloc | 1.5 |
| EGDMA | 0.8 |
| Blue HEMA | 0 |
| CGI 819 | 0.2 |
| % Diluent* | 40 |
| Diluent | 29/11 blend of t-amyl alcohol and 2,500 MW PVP |

The physical properties of the lenses (Dk, water content, advancing dynamic contact angle, modulus, elongation and dynamic coefficient of friction were measured and are shown in Table 9, below.

EXAMPLE 6

The lenses of Example 5 were clinically evaluated against Acuvue2® brand contact lenses. The clincial evaluation, was a double masked, bilateral cross-over study with 43 patients. The lenses were worn in a daily wear mode (nightly removal) for a period of two weeks using Complete® cleaning and disinfection system upon lens removal. After 30 minutes and two weeks of wear for each lens, the patients were asked to rate the lenses for the following: dryness, initial comfort, end of day comfort, overall preference. Each attribute is rated on a visual analog questionnaire form. The form consisted of a visual analog from 0 to 50 with verbal descriptions at specific intervals to explain the scale to the subject (50=excellent, 0=very poor). Lenses, which score above 42 on the scale, are considered good to excellent. A mean difference of five units between the lens types is considered clinically significant. Table 5 shows the preference results from the clinical study.

TABLE 8

| Attribute | Ex. 5 v. Acuvue2® contact lenses |
|---|---|
| Overall Preference | 15:14 |
| Initial Comfort | 14:12 |
| Dryness | 12:8 |
| End of Day Comfort | 12:10 |

TABLE 9

| Property | Ex 5 | Acuvue2® contact lenses |
|---|---|---|
| Dk (barrer) | 57 | 21 |
| Center thickness (mm) | 0.057-0.079 | 0.084 |
| % H2O | 47-49 | 58 |
| DCA (°) | 33-66 | 82 |
| Modulus (psi) | 66 | 37 |
| Elongation (%) | 258 | 120 |
| COF (@ 10 cm/s) | 0.006 | |

EXAMPLE 7

The lenses of Example 1 were compared to Focus Night & Day® brand contact lenses (commercially available from Ciba Vision) in a one week, daily wear, bilateral cross-over, randomized, design study. There were 35 patients in the study. The lenses were worn in a daily wear mode (nightly removal) for a period of two weeks using ReNu MultiPlus Multi-Purpose Solution for cleaning upon lens removal. After 30 minutes and one week of wear for each lens, the patients were asked to rate the lenses for the following: dryness, initial comfort, end of day comfort, overall preference. Each attribute is rated on a visual analog questionnaire form. The form consisted of a visual analog from 0 to 50 with verbal descriptions at specific intervals to explain the scale to the subject (50=excellent, 0=very poor). Lenses, which score above 42 on the scale, are considered good to excellent. A mean difference of five units between the lens types is considered clinically significant. Table 10 shows the preference results from the clinical study. Table 11 shows a comparison of physical properties between the lens of Example 1 and the Focus Night and Day brand contact lens.

TABLE 10

| Attribute | Ex. 1 v. Focus Night and Day® contact lenses |
|---|---|
| Overall Preference | 25:5 |
| Initial Comfort | 25:3 |
| Dryness | 18:3 |
| End of Day Comfort | 22:5 |

TABLE 12

| Property | Ex 1 | Focus Night and Day® contact lenses |
|---|---|---|
| Dk (barrer) | 107 | 140 |
| Center thickness (mm) | 0.088-0.092 | NM |
| % H2O | 35-37 | 24 |
| DCA (°) | 48-53 | 67 |
| Modulus (psi) | 86 | 238 |
| Elongation (%) | 250 | 178 |
| COF (@ 10 cm/s) | 0.005 | 0.049 |

NM = not measured, but nominal center thickness was reported to be 0.08

EXAMPLE 8

The lenses of Example 1 were compared to PureVision® brand contact lenses (commercially available from Bausch & Lomb) in a one month, continuous wear, contarlateral, randomized per eye study. There were 26 patients in the study. After 30 minutes and one week of wear for each lens, the patients were asked to rate the lenses for the following: dryness, initial comfort, end of day comfort, overall preference. Each attribute is rated on a visual analog questionnaire form. The form consisted of a visual analog from 0 to 50 with verbal descriptions at specific intervals to explain the scale to the subject (50=excellent, 0=very poor). Lenses, which score above 42 on the scale, are considered good to excellent. A mean difference of five units between the lens types is considered clinically significant. Table 12 shows the preference results from the clinical study. Table 13 shows a comparison of physical properties between the lens of Example 1 and the PureVision and Day brand contact lens.

TABLE 12

| Attribute | Ex. 1 v. PureVision ® contact lenses |
|---|---|
| Overall Preference | 14:2 |
| Initial Comfort | 14:2 |
| Dryness | 11:2 |
| End of Day Comfort | 13:1 |

TABLE 13

| Property | Ex 1 | PureVision ® contact lenses |
|---|---|---|
| Dk (barrer) | 107 | 79 |
| Center thickness (mm) | 0.088-0.092 | NM |
| % H2O | 35-37 | 38 |
| DCA (°) | 48-53 | 117 |
| Modulus (psi) | 86 | 155 |
| Elongation (%) | 250 | 286 |
| COF (@ 10 cm/s) | 0.005 | 0.020 |

NM = not measured, but nominal center thickness was reported to be 0.09

EXAMPLE 9

A clinical study was conducted comparing patient response to the lenses of Example 5, Focus Night and Day® contact lenses, Acuvue®2 brand contact lenses and for redness, no contact lens wear. The lenses were worn in a daily wear modality for four weeks. The replacement interval for the Focus Night and Day® contact lenses was four weeks and the replacement interval for the lenses of Example 5 and the Acuvue®2 lenses was two weeks. Forty-eight patients who had never worn contact lenses were recruited for the study and randomly assigned to wear on of the three lenses being studied, or no lenses at all. The subjects were not informed of the brand of lens they were evaluated and did not see any lens product packaging. The study was a four cell, parallel, randomized and controlled double masked dispensing study. Optifree Express was used as the lens care solution. For all visits one investigator performed lens related assessments (such as lens fit) and removed the contact lenses (if worn by the subject being evaluated) and another performed redness and lid irritation assessments. In this way, the lens identity was masked from the investigators performing the performance evaluations. Photographs of the patients right eye in each group were taken prior to dispensing the contact lenses and after 1 month. Representative photographs are shown in FIGS. 1 through 4. In each Figure the photograph on the right was the photograph taken prior to lens wear and the photograph on the left was taken at the four month visit. Each visit was conducted at least 2 hours after the patient had woke up that day. FIG. 1 contains the photographs from a blue eyed patient who wore spectacle lenses throughout the study. As can be seen from comparing the photographs in FIG. 1, there is no significant difference in redness in the eyes of this patient.

Figure 2:
FIG. 2 contains two photographs of the right eye of a clinical trial patient wearing the contact lenses of Example 5 for one month of daily wear.
Figure 2:
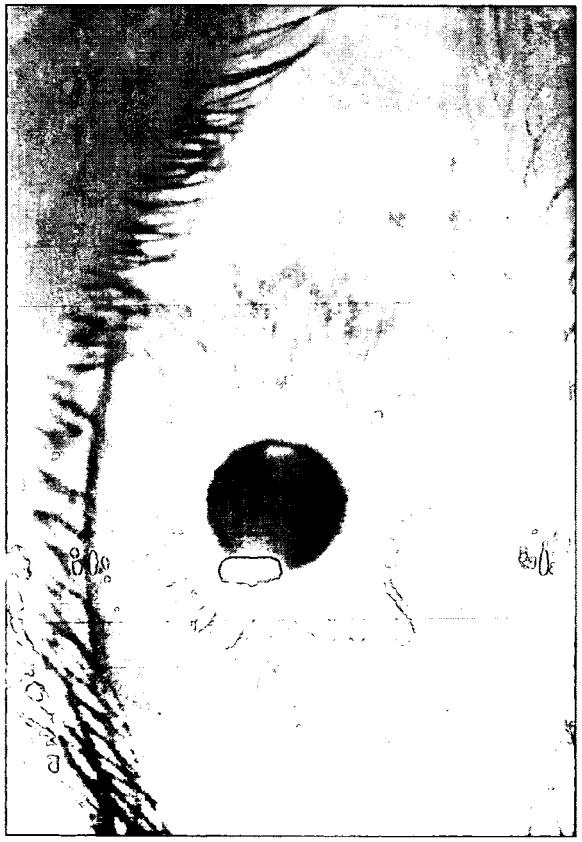

FIG. 2 contains the photographs from a blue eyed patient who wore lenses of Example 5 throughout the study. As can be seen from comparing the photographs in FIG. 2, there is no significant difference in redness in the eyes of this patient, even after wearing contact lenses on a daily wear basis for a month.

Figure 3:
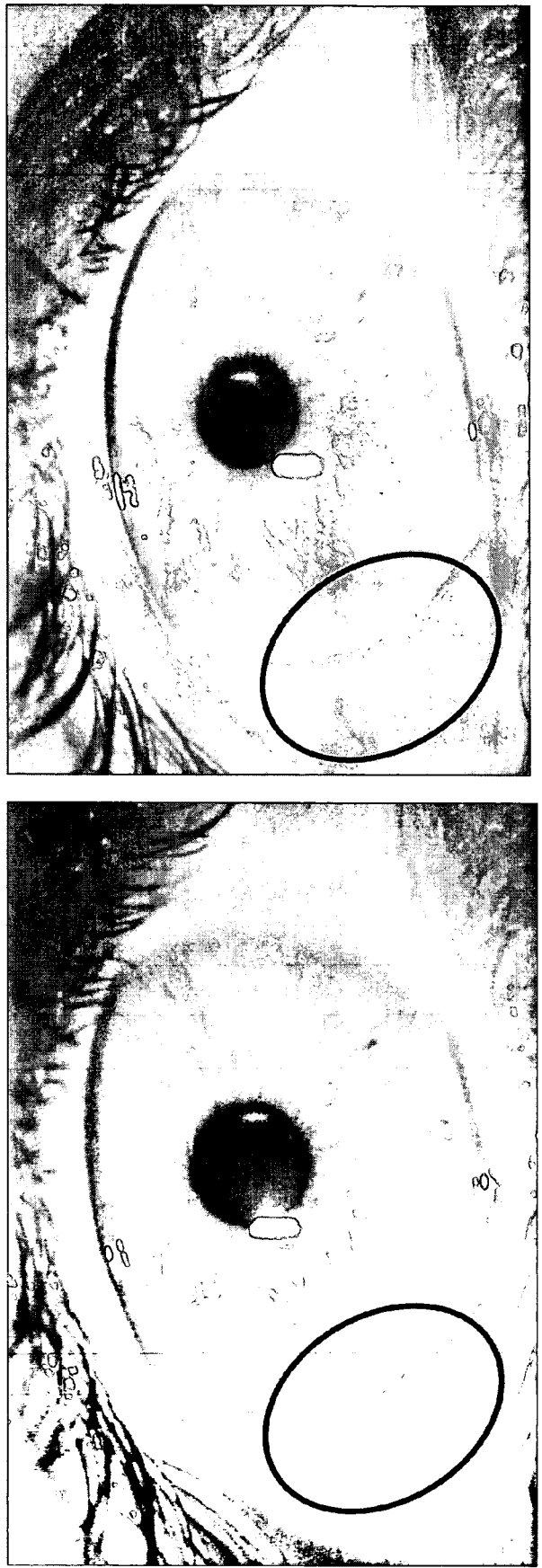
FIG. 3 contains two photographs of the right eye of a clinical trial patient wearing Focus Night and Day® brand contact lenses for one month of daily wear.

FIG. 3 contains the photographs from a blue eyed patient who wore Focus Night and Day® contact lenses throughout the study. As can be seen from comparing the photographs in FIG. 3, and particularly the area within the circle, there is a discernable increase in general redness, which manifests itself as increased and more pronounced visible capiliaries in the conjuctiva. General redness, as shown here, may reflect irritation and/or dryness.

Figure 4:
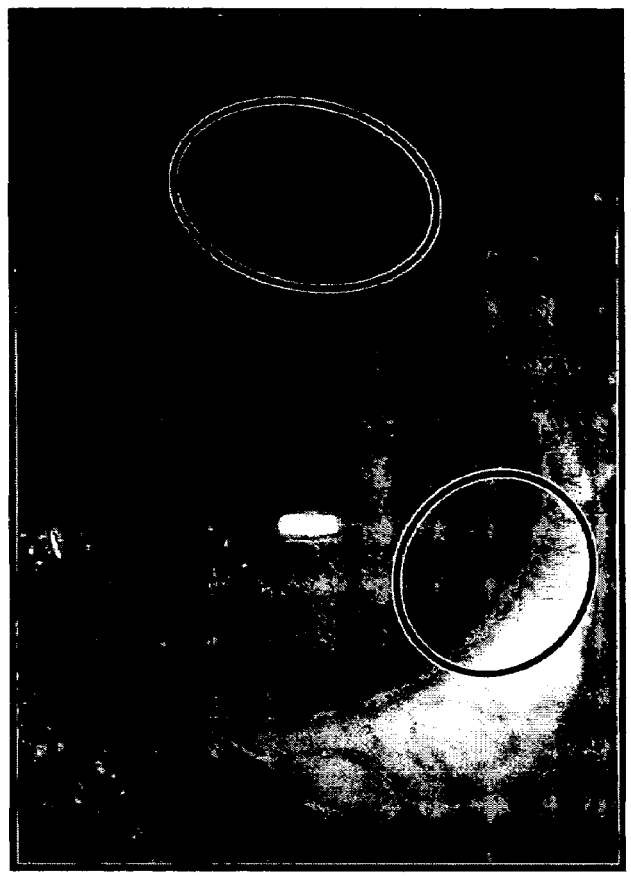
FIG. 4 contains two photographs of the right eye of a clinical trial patient wearing Acuvue®2 brand contact lenses for one month of daily wear.
Figure 4:

FIG. 4 contains the photographs from a blue eyed patient who wore Acuvue®2 brand contact lenses throughout the study. As can be seen from comparing the photographs in FIG. 4, and particularly the area within the circles, there is a discernable increase in general redness, which manifests itself as increased and more pronounced visible capiliaries in the conjuctiva (circles on the right hand side of the slides). General redness, as shown here, may reflect irritation and/or dryness. There is also an increase in limbal redness, which is shown in the picture on the right as more redness around the limbal ring (lower left circle). An increase in limbal redness may reflect less than optimum concentrations of oxygen is reaching the cornea.

Figure 5:
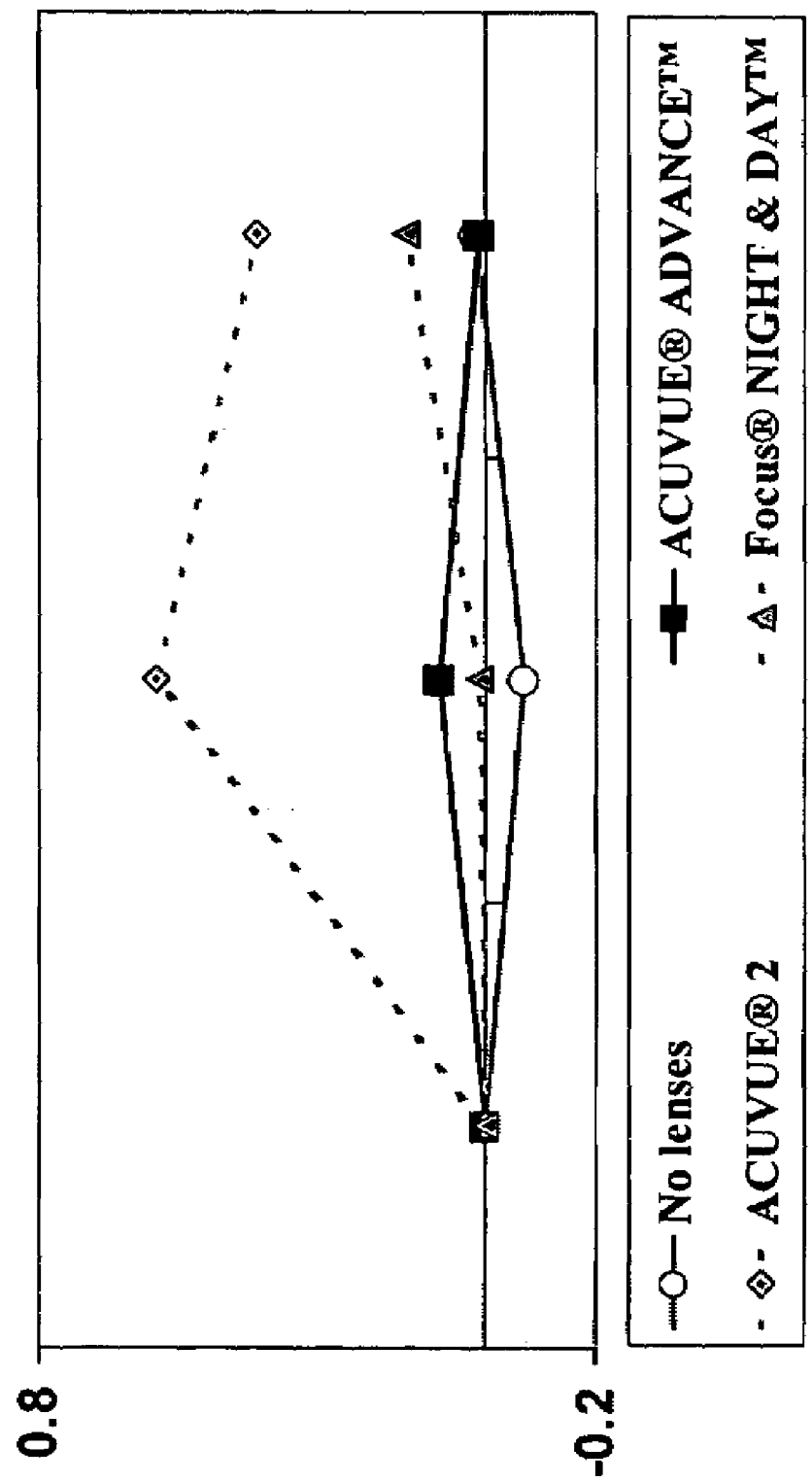
FIG. 5 is a graph comparing the limbal redness observed in patients wearing spectacle lenses, the contact lenses of Example 5, Focus Night and Day® brand contact lenses and Acuvue®2 brand contact lenses.
Figure 6:
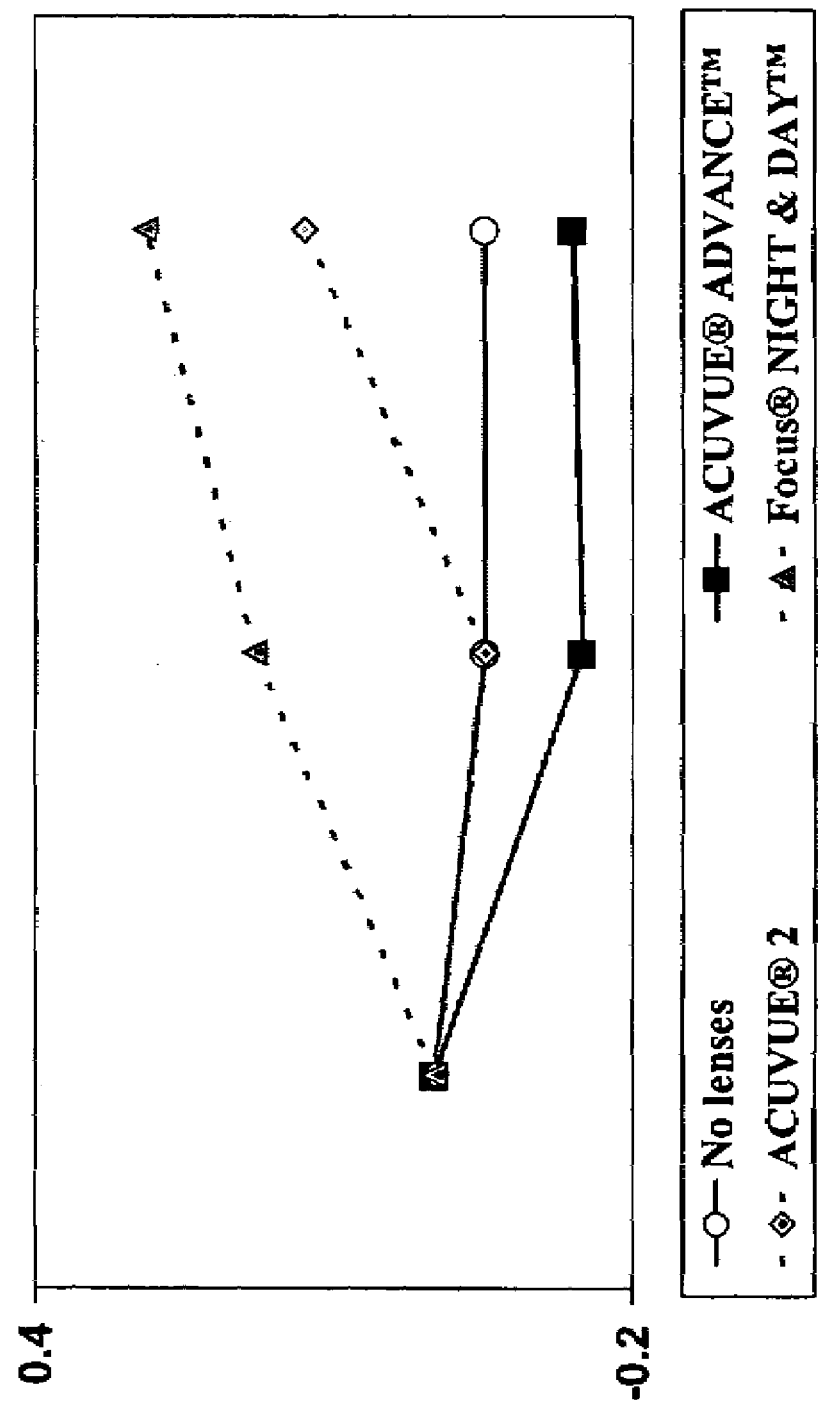
FIG. 6 is a graph comparing lid irritation observed in patients wearing spectacle lenses, the contact lenses of Example 5, Focus Night and Day® brand contact lenses and Acuvue®2 brand contact lenses.
Figure 7:
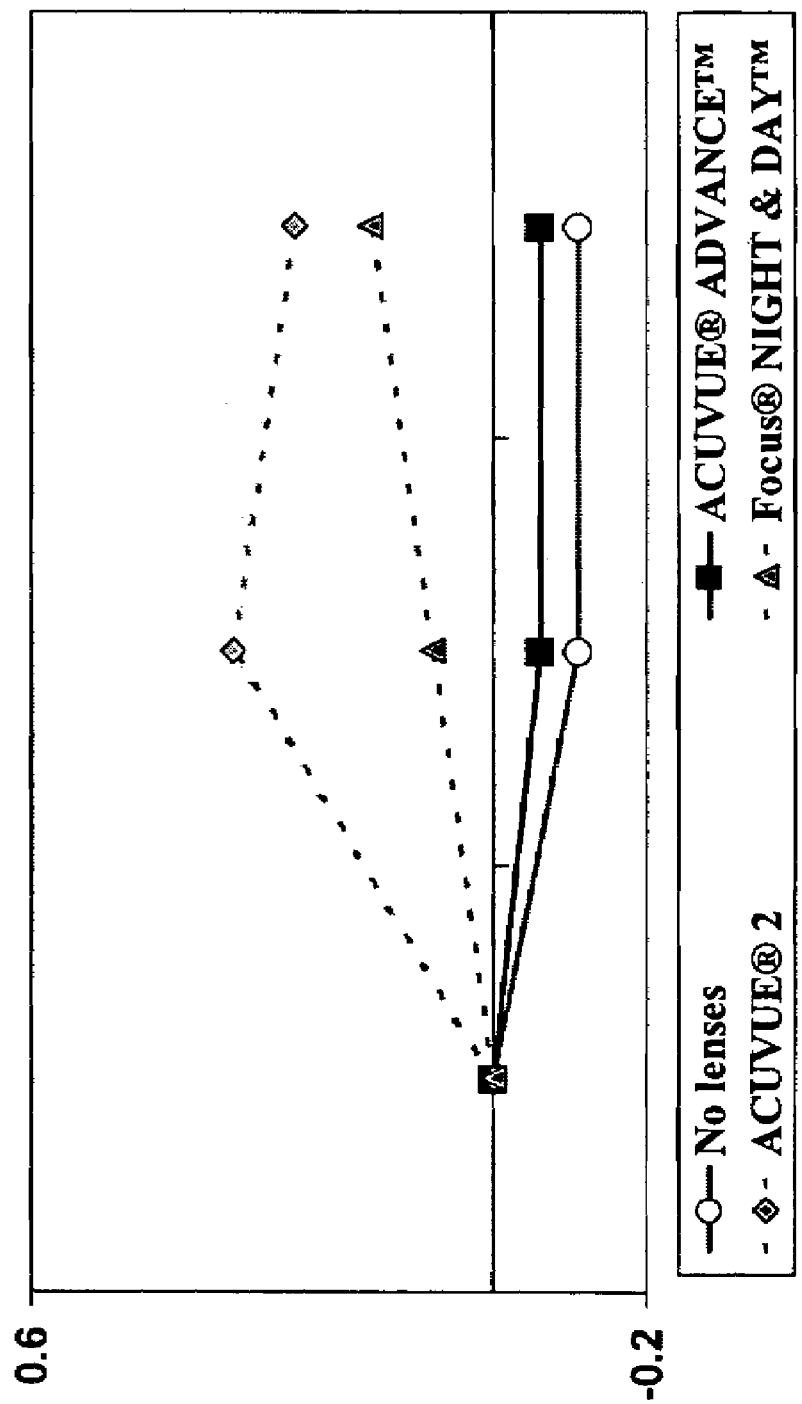
FIG. 7 is a graph comparing the overall redness observed in patients wearing spectacle lenses, the contact lenses of Example 5, Focus Night and Day® brand contact lenses and Acuvue®2 brand contact lenses.

Ratings for limbal redness, lid irritation and overall redness were also collected by the masked investigator, and are shown graphically in FIGS. 5 through 7, respectively. FIGS. 5-7 clearly show that the lenses of Example 5 are superior to Acuvue2 brand contact lenses in all three metrics, and superior to Focus Night and Day® contact lenses with respect to lid irritation and overall redness.

Survey information from the patients related to duration of daily lens wear and the number of hours lens wear was comfortable, was collected by an independent research organization by phone one week after the initial visit and after the replacement interview (4 weeks for Focus Night and Day® contact lenses, and two weeks for the lenses of Example 5 and Acuvue®2 contact lenses. The results of the phone survey are shown in Table 14, below.

TABLE 14

| Lens | % wore lens ≧9 hrs | % reporting comfortable wear for ≧9 hrs |
|---|---|---|
| Ex. 5 | 94 | 87 |
| FND | 91 | 69 |
| AV2 | 90 | 77 |

EXAMPLE 10

2.02 g 1-vinyl-2-pyrrolidnone (NVP), 0.03 g of ethyleneglycol dimethacrylate (EGDMA), and 10 µL of DAROCUR 1173 were combined. The blend was degassed by placing under vacuum for 30 minutes. Polymer was formed by placing 100 µL of the blend into a polypropylene molds under nitrogen and curing with UV light from Phillip's TL20W/09 bulbs for about 45 minutes. The molds were opened and polymer obtained was released into buffered saline solution at 25° C. The buffered saline was replaced with fresh solution every 30 minutes for a total of three soakings. The water content of the hydrated polymer was determined and is reported in Table 15, below.

EXAMPLES 11-14

The procedure of Example 10 was repeated substituting the monomers listed in Table 15 for NVP. The results are shown in Table 15.

TABLE 15

| Ex. # | Monomer | H2O % |
|---|---|---|
| 10 | 1-Vinyl-2-pyrrolidnone | 90.1 ± 0.7 |
| 11 | N'N-Dimethyl acrylamide | 81.4 ± 0.0 |
| 12 | Acrylic acid | 78.4 ± 0.2 |
| 13 | N-Methyl-N-vinylacetamide | 94.7 ± 0.4 |
| 14 | 1.41 g HEMA/0.61 g MAA | 78.0 ± 0.3 |

We claim:

1. A soft hydrogel contact lens having a tensile modulus less than about 140 psi, oxygen transmissibility of at least about 70 barrers/mm and a dynamic coefficient of friction of less than about 0.01 when measured at a sliding speed of 10 cm/second, wherein said contact lens comprises at least one lubricious polymer in or on said contact lens, provided however, when said lubricious polymer is coated on said contact lens, said lubricious polymer is not polyacrylic acid or poly(N,N-dimethylacrylamide).

2. The contact lens of claim 1 wherein said oxygen transmissibility is at least about 85 barrers/mm.

3. The contact lens of claim 1 further comprising an advancing dynamic contact angle of less than about 90°.

4. The lens of claims 1 further comprising a water content of at least about 30%.

5. The lens of claim 1 wherein said oxygen transmissibility is at least about 80 barrers/mm.

6. The lens of claim 2 wherein said oxygen transmissibility is at least about 90 barrers/mm.

7. The lens of claim 1 wherein said oxygen transmissibility is at least about 110 barrers/mm.

8. The lens of claim 1 wherein said oxygen transmissibility is at least about 140 barrers/mm.

9. The lens of claim 3 wherein said advancing dynamic contact angle is less than about 80°.

10. The lens of claim 3 wherein said advancing dynamic contact angle is less than about 70°.

11. The lens of claim 4 wherein said water content is between about 30% and about 50%.

12. The lens of claim 6 wherein said lens further comprises a water content between about 30% and about 50%.

13. The lens of claim 1 further comprising a tensile modulus of less than about 120 psi.

14. The lens of claim 1 further comprising a tensile modulus of less than about 100 psi.

15. The lens of claim 1 further comprising a tensile modulus of about 40 to about 100 psi.

16. The lens of claim 2 wherein said lens is formed from a silicone hydrogel.

17. The lens of claim 16 wherein said silicone hydrogel is formed from a reaction mixture comprising at least about 20 weight % silicone containing components.

18. The lens of claim 16 wherein said silicone hydrogel is formed from a reaction mixture comprising between about 20 and about 70 weight % silicone containing components.

19. The lens of claim 17 wherein said reaction mixture comprises at least one monofunctional silicone containing component and less than about 10 mmol multifunctional components/100 g reactive components.

20. The lens of claim 19 wherein said multifunctional components comprise less than about 7 mmol/100 g of the reactive components.

21. The lens of claim 19 wherein said monofunctional silicone containing component is selected from the group consisting of polysiloxanylalkyl(meth)acrylic monomers, mono-functional polydimethylsiloxanes and mixtures thereof.

22. The lens of claim 19 wherein said multifunctional components comprise multifunctional silicone containing components.

23. The lens of claim 22 wherein said multifunctional silicone containing components are selected from the group consisting of poly(organosiloxane) prepolymer, multifunctional silicone-containing vinyl carbonate and vinyl carbamate monomers, polyurethane macromers, and combinations thereof.

24. The lens of claim 17 wherein at least about 30 weight % of said silicone components comprise silicone containing compounds free from branching trimethylsiloxy groups.

25. The lens of claim 17 wherein at least about 60 weight % of said silicone components comprise silicone containing compounds free from branching trimethylsiloxy groups.

* * * * *